United States Patent [19]

Beedy

[11] 3,708,190
[45] Jan. 2, 1973

[54] DUAL TENSION STRING HOLDER
[75] Inventor: Robert G. Beedy, Hometown, Ill.
[73] Assignee: B. H. Bunn Company, Alsip, Ill.
[22] Filed: March 15, 1971
[21] Appl. No.: 123,974

[52] U.S. Cl..................................................289/13
[51] Int. Cl. ............................................B65h 69/04
[58] Field of Search.....................................289/2, 13

[56] References Cited

UNITED STATES PATENTS

| | | | |
|---|---|---|---|
| 3,418,014 | 12/1968 | Nolt et al. | 289/13 |
| 3,418,015 | 12/1968 | Nolt | 289/13 |
| 3,467,424 | 9/1969 | Wenzel et al. | 289/13 |

*Primary Examiner*—Louis K. Rimrodt
*Attorney*—Davis, Lucas, Brewer & Brugman

[57] ABSTRACT

An automatically operated device for alternately increasing and decreasing the tension on the retained end of the twine in a knotting mechanism used in a twine tying machine. The standard knotting mechanism is used in connection with a standard string holder, the latter normally having a compression spring to exert pressure on the retained end of the twine to hold said end while the twine is being wrapped around a bundle or the like and thereafter while a knot is being tied in the ends of the wrapped twine. Means are provided for increasing the compression of the spring while the twine is being wrapped around a bundle, and for reducing the said spring compression while the knot is being tied.

5 Claims, 4 Drawing Figures

PATENTED JAN 2 1973

INVENTOR
Robert G. Beedy
by David Lucas, Brewer
and Brugman Attys

DUAL TENSION STRING HOLDER

This invention relates to tying machines which wrap a reach of twine around a bundle and secure the ends of the wrapped twine together with a knot.

Tying machines for bundles or the like are normally designed to use ordinary natural fiber twine as the tying medium. The twine is threaded from a twine cone through a rotatable twine arm, and then fastened to a string holder located below the tying machine table adjacent the knotting mechanism thereof. When a tying cycle is started, the end of the twine is held by the string holder and the twine arm is accelerated almost instantly from a standstill to the rotational speed of the drive for the arm to wrap the twine around the bundle to be tied. The sudden rotation of the twine arm results in imparting a jerk upon the string and the string holder. During the knot-tying cycle which follows when the arm comes to rest, additional twine is drawn through the arm to supply the quantity of twine required for the knot. A constant tension must be placed on the twine during the knotting cycle, but it should not be excessive, otherwise the knot will not tie.

As long as twine made of natural fibers, such as cotton or hemp, is used, a constant tension can be arrived at for the string holder which will withstand the sudden jerk produced by the arm at the start of the cycle, and yet will allow the twine to be drawn through the arm when it is required for tying the knot, without interfering with the knot-tying operation. However, twines have recently been proposed for tying machines which are stronger than those made from natural fibers. The new twines are made of synthetic materials and are less flexible than the twines made from natural fibers. The increased stiffness of the synthetic twine creates a greater running tension in the twine than is produced by the same setting of the twine tensioner normally used with natural fiber twine. This greater running tension causes the twine to be pulled out of the string holder at the sudden start of the twine arm in its wrapping cycle. If, however, the tension in the string holder is increased to withstand the sudden jerk produced at starting, the increased tension interferes with the knotting cycle and results in a failure to produce a knot.

The principal object of this invention is to provide a tensioning means for the string holder of a tying machine which will hold the end of a synthetic fiber twine or tape throughout the twine wrapping and twine knotting cycle while permitting each of these functions to be performed successfully.

As a more specific object, this invention seeks to provide means for creating a specific tension in the twine held by the string holder of a tying machine knotting mechanism during the twine wrapping operation of the machine to resist pulling out the twine by the start-up of the wrapping operation, and to create a lesser tension in that twine during the twine knotting operation.

As a further object, this invention has within its purview the provision of means automatically operated by the knotting mechanism of a tying machine to increase the compression of the spring of the string holder of the machine when the knotting function of the machine is not being performed, and to restore normal compression of the spring during the said knotting function.

These and other objects of this invention will become apparent from the following detailed description of a preferred embodiment of this invention when taken together with the accompanying drawings in which.

In the tying machine selected to illustrate this invention the knotting mechanism is mounted on a horizontal pivot so that it can be swung out of the way of the twine while the twine is being wrapped around a bundle, and thereafter can be swung into the twine to perform the knotting operation. The string holder, however, is mounted on a fixed portion of the frame and does not change its position during either the twine wrapping or knot-tying operations. The distance therefore between the string holder and a given portion or point on the knotting mechanism varies between the twine wrapping and twine knotting operations. The present invention takes advantage of this change in distance to change the location of the reaction point of the spring of the string holder as between the twine wrapping and twine knotting operations, the reaction point being selected to increase the pressure on the string holder during the wrapping operation and to decrease the pressure on the string holder during the knot-tying operation. Thus the reaction plate against which the string holder spring rests is moved by a linkage connecting the reaction plate to the swinging knotting mechanism so that one tension is provided for the wrapping operation and a lesser one for the knotting operation. The changes in tension are effected entirely automatically by the normal operation of the machine in performing its wrapping and knotting cycles.

Figure 1:
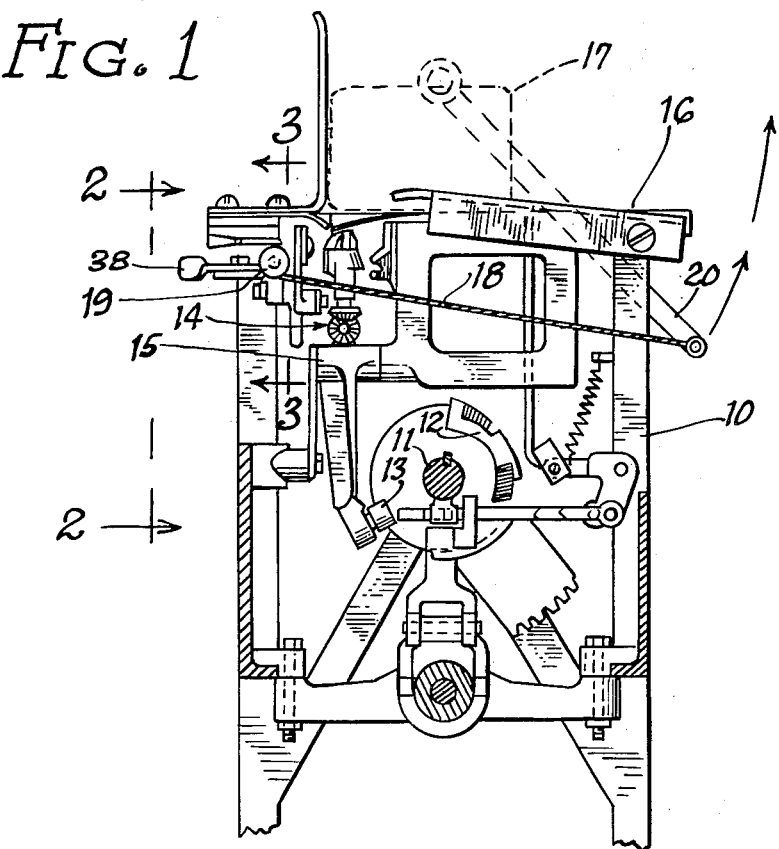
FIG. 1 is an elevational view of a typical tying machine to which this invention may be applied.

Referring now to FIG. 1 for a general description of a tying machine to which this invention is applicable, there is shown a tying machine frame 10 in cross section, said frame supporting a horizontal shaft 11 on which is mounted for rotation therewith a cylindrical cam 12. Said cam is adapted to co-operate with a roller follower 13 mounted on the lower end of a knotter mechanism 14, said knotter mechanism in turn being mounted for swinging movement about a shaft the axis of which is shown at 15. A bundle supporting table 16 is provided at the top of frame 10, a bundle 17 being shown in dotted outline mounted thereon in readiness to be wrapped with twine and tied. The twine is shown at 18, one end of which is held by a string holder 19 mounted on a fixed portion of frame 10. The other end of said twine passes through a hollow twine arm 20 adapted to be rotated around bundle 17 to wrap a reach of twine therearound. Details of operation of the tying machine, except for the novel string holder tensioning means of this invention, are disclosed and described in U.S. Pat. to B. H. Bunn No. 2,898,847 granted Aug. 11, 1959 and hence will not be described in detail herein.

The operation of the tying machine of FIG. 1 is such that when a wrapping operation is initiated, twine arm 20 is suddenly accelerated from a standing position similar to that shown in FIG. 1, to the full rotational velocity of the drive for the arm. It may be apparent from FIG. 1 that when arm 20 suddenly begins to rotate, twine 18 between arm 20 and string holder 19 is given a jerk which tends to pull the string out of the string holder 19.

Figure 2:
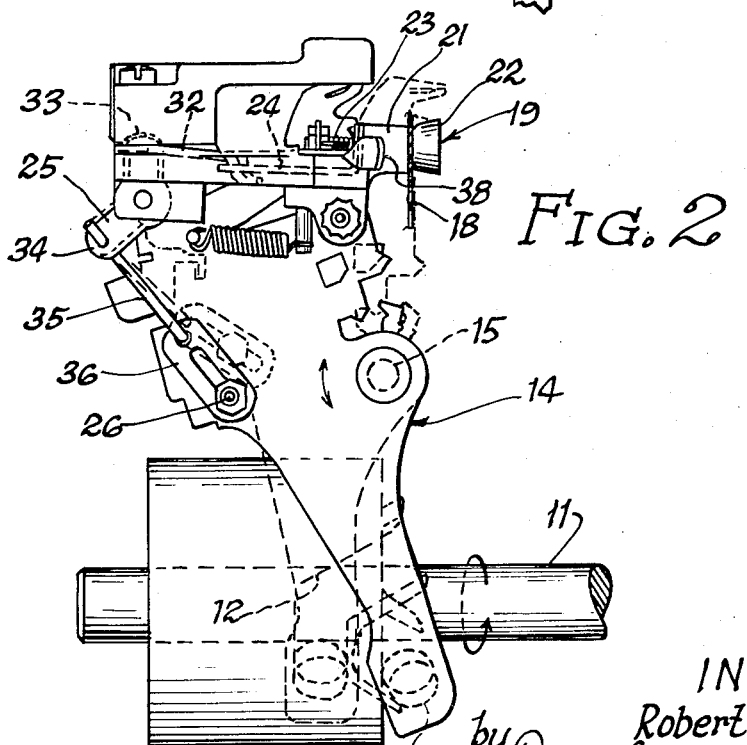
FIG. 2 is an enlarged elevational view of the knotting mechanism and drive therefor of the machine of FIG. 1.

Referring to FIG. 2, the knotter mechanism 14 is shown in solid lines in the position it assumes during the time the twine is being wrapped around bundle 17, and in dotted outline in the position it assumes when the wrapping operation has been completed and the knotting operation is being performed. The string holder 19, however, is mounted on a portion 21 of frame 10, said portion remaining fixed during both the twine wrapping and knot-tying operations. The twine is held between the string holder button 22 and the fixed portion 21 by a compression spring 23 in a manner to be described in detail hereinafter. Spring 23 reacts against a portion of a plate 24 which is reciprocated in a horizontal direction by a bell crank 25, the latter, in turn, being linked to a pin 26 mounted on a knotter mechanism 14 and oscillatable therewith about axis 15.

Shaft 11 is rotated in timed relation to the drive for arm 20 so that when arm 20 has completed its wrapping operation, cam 12 will engage follower 13 and swing the knotting mechanism about axis 15 to the dotted position shown in FIG. 2. This swinging movement is utilized through the bell crank 25 and plate 24 to change the compression of the spring 23 as between the twine wrapping and twine knotting operations in the manner now to be described.

Figure 3:
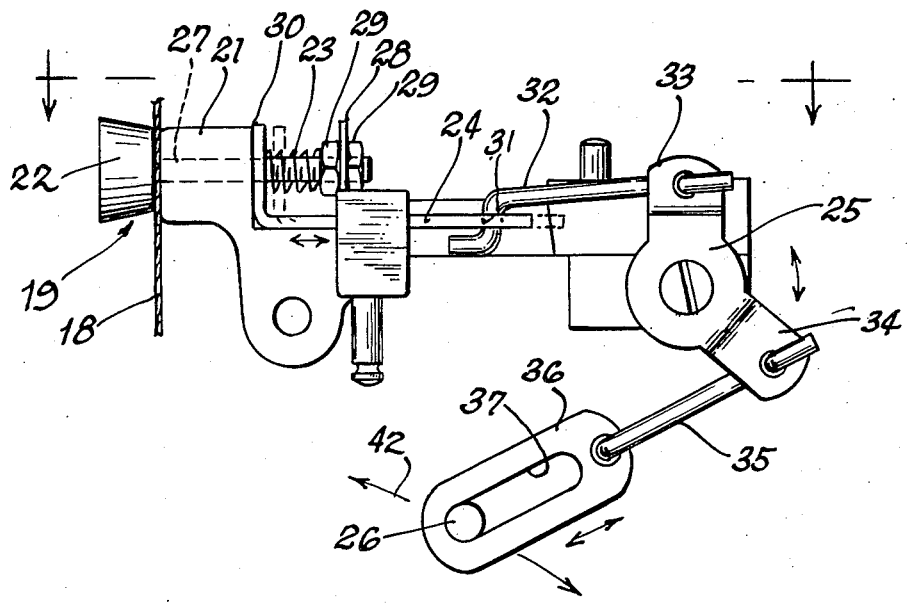
FIGS. 3 and 4 are respectively still further enlarged fragmentary views of the knotting mechanism of FIG. 2 showing the twine tensioner of this invention applied thereto.
Figure 4:
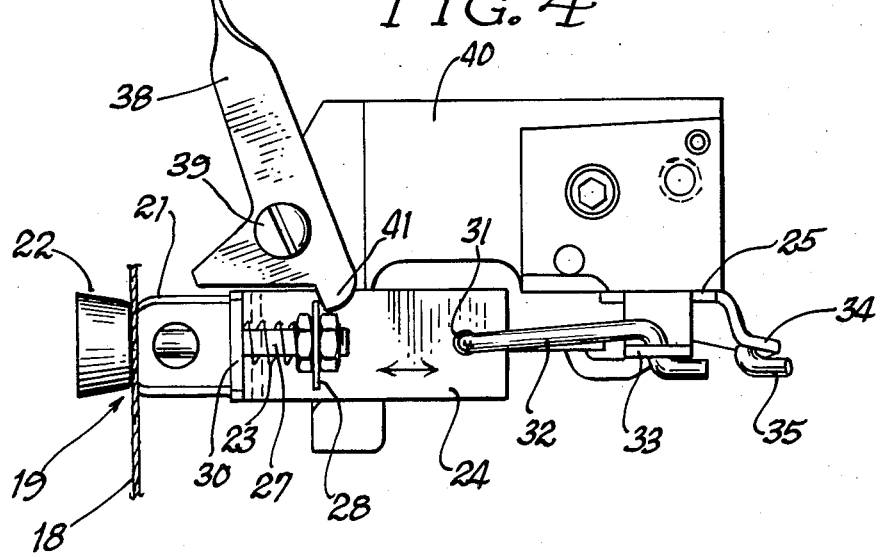

Referring to FIGS. 3 and 4, and particularly to FIG. 3 wherein the rear elevation of the string holder tension changing mechanism of this invention is shown, it will be observed that string holder button 22 has secured thereto a pin 27 passing through a suitable opening (not shown) in fixed portion 21. The right-hand end of pin 27 as viewed in FIG. 3, is threaded and passes through a washer 28 axially fixed to pin 27 by a pair of nuts 29. The inner nut forms an abutment for one end of spring 23. The other end of said spring reacts against a flange 30 on plate 24, said flange having an appropriate opening (not shown) through which pin 27 passes.

As shown in FIG. 4, plate 24 has an aperture 31 near its right-hand end as viewed in this FIG. in which is received one end of a link 32 which connects plate 24 to one arm 33 of bell crank 25. The other arm 34 of bell crank 25 is connected by a link 35 to a lost-motion connection 36 having a slot 37 in which pin 26 is received. The movement of knotter mechanism 14 about its axis 15 is normally such as to provide a greater movement of pin 26 than is required to operate plate 24, that is, to reciprocate it between its normal spring tension position as shown in FIG. 3 and its increased spring tension position as shown in dotted lines in that FIG. The lost-motion connection 36 dissipates the unwanted excess movement of pin 26.

When the twine is first threaded through the twine arm 20 and its end is engaged by string holder 19, it is necessary to separate button 22 from the fixed portion 21 of the string holder so that the end of the twine can be inserted therebetween. This separation is effected manually by a lever 38 pivoted at 39 on an extension 40 of fixed portion 21, said lever 38 having a finger 41 which engages washer 28 and pushes washer 28 to the left, as viewed in FIGS. 3 and 4, against the action of spring 23. This leftward movement of washer 28 results in a movement of button 22 away from fixed portion 21 as required to insert the twine therebetween.

The movement of pin 26 relative to lost-motion connection 36 is illustrated by the arrow 42 in FIG. 3. It may be noted that over a portion of the movement of pin 26 the lost-motion provided by slot 37 is taken up, and continued movement of pin 26 to the left, as shown in FIG. 3, causes rotation of bell crank 25 in a clockwise direction as viewed in that FIG. which, in turn, results in pulling plate 24 and flange 30 to the right the doted position. This compresses spring 23 and increases the initial resistance of button 22 to separation from fixed portion 21, that is, it increases the pressure on the twine end held between button 22 and portion 21. Such leftward movement of pin 26 as just described takes place when the knotting mechanism 14 moves to the position shown in solid lines in FIG. 2 and then beyond. The dotted position corresponds to the position taken by the knotting mechanism at all times when the knotting operation is not being performed. Thus, when the twine wrapping operation commences, the compression on the twine is a maximum and may be regulated to be sufficient to withstand the jerk of the twine by the twine arm when the twine arm starts its rotational movement.

Movement of pin 26 to the right in FIG. 3 first allows the links 24, 32, 35 and 36 to be moved by spring 23 until flange 30 abuts upon portion 21. Continued movement of pin 26 in the same direction beyond the position shown in FIG. 3 causes pin 26 to move in slot 37 without moving any of the intermediate linkages between itself and flange 30, in a manner to affect the position of flange 30, and hence spring 23 may assume its extended, and therefore lower, initial pressure position which is the desired position for the knotting operation.

It may be apparent that the interposition of the plate 24 and its flange 30 in the spring holder system has no bearing whatsoever upon the operation of the manually operated lever 38 so that the function of threading the twine into the string holder can proceed as before.

It is understood that the connecting means between the knotter mechanism 14 and the string holder may take other forms without departing from the function performed by the form illustrated and that therefore the scope of this invention is not to be limited to the form illustrated but is to be determined by the appended claims.

I CLAIM:

1. In combination, a knotter mechanism for a twine tying machine, a rotatable twine feeding means for wrapping a reach of twine around a bundle, and a string holder for holding one end of the twine while the twine is being wrapped around a bundle by said rotatable twine feeding means and knotted, said string holder comprising relatively movable portions, resilient means urging said movable portions together with a predetermined force to hold the twine end between said portions, and means operated in timed relation to the operation of the knotter mechanism for establishing a different value of said force for the twine wrapping operation of said machine than for the knotting operation of said machine, said knotter mechanism being intermittently operable, and said last-mentioned means establishing a higher force for the twine wrapping operation than for the knotting operation, a pivoted support for said knotter mechanism, means for oscillating said knotter mechanism on its pivoted support, said relatively movable portion of said string holder comprising the reaction member for said resilient means and said means operated in timed relation to the operation of the knotter mechanism comprising links connecting said knotter mechanism to said reaction member to move said reaction member relative to said fixed part and thereby change the force exerted by said resilient means upon said movable portion of the string holder.

2. The combination described in claim 1, said relatively movable portions of the string holder comprising a fixed abutment, a button adjacent the fixed abutment, a stem secured to the button and passing through the fixed abutment, a second abutment spaced from the first said abutment and secured to the stem, a plate, a flange on the plate, said resilient means being compressed between the second abutment and the flange on the plate, said means operated in timed relation to the operation of the knotter mechanism being connected to said plate and establishing said different values of said force by moving said plate and flange toward and away from said second abutment whereby to change the initial compression of said spring.

3. The combination described in claim 2, said flange on the plate extending between the resilient means and the fixed abutment and having an opening through which the stem passes, and said resilient means comprising a helical spring disposed around the stem and compressed between the flange and the said second abutment secured to the stem.

4. The combination described in claim 2, said means operated in timed relation to the operation of the knotter mechanism comprising links connecting said knotter mechanism to said reaction member, the movement of said knotter mechanism being greater than the movement of the reaction member, and one of said links being a lost-motion connection to absorb the excess movement of said knotter mechanism.

5. The combination described in claim 2, said means operated in timed relation to the operation of the knotter mechanism comprising links connecting said knotter mechanism to said reaction member, the movement of the knotter mechanism being in a direction different from that of the reaction member and said links including a bell crank for changing the direction of movement of the knotter mechanism relative to the reaction member.

* * * * *